US010025855B2

(12) United States Patent
Marlow

(10) Patent No.: US 10,025,855 B2
(45) Date of Patent: Jul. 17, 2018

(54) FEDERATED COMMUNITY SEARCH

(75) Inventor: Keith A. Marlow, Galston (AU)

(73) Assignee: Excalibur IP, LLC, New York, NY (US)

( * ) Notice: Subject to any disclaimer, the term of this patent is extended or adjusted under 35 U.S.C. 154(b) by 422 days.

(21) Appl. No.: 12/181,268

(22) Filed: Jul. 28, 2008

(65) Prior Publication Data
US 2010/0023502 A1 Jan. 28, 2010

(51) Int. Cl.
G06F 17/30 (2006.01)
(52) U.S. Cl.
CPC .............. G06F 17/30864 (2013.01)
(58) Field of Classification Search
CPC ......... G06F 17/30864; G06F 16/30011; G06F 17/30867
See application file for complete search history.

(56) References Cited

U.S. PATENT DOCUMENTS

| | | | |
|---|---|---|---|
| 6,321,228 B1* | 11/2001 | Crandall | G06F 17/30864 |
| 6,944,612 B2* | 9/2005 | Roustant et al. | 707/706 |
| 7,346,613 B2 | 3/2008 | Hurst-Hiller et al. | |
| 7,725,453 B1* | 5/2010 | Chen et al. | 707/711 |
| 2003/0088559 A1 | 5/2003 | Teranishi | |
| 2003/0212673 A1* | 11/2003 | Kadayam et al. | 707/3 |
| 2004/0243489 A1* | 12/2004 | Mitchell | G06Q 10/10 705/30 |
| 2005/0080795 A1* | 4/2005 | Kapur | G06F 17/30705 |
| 2005/0149496 A1 | 7/2005 | Mukherjee et al. | |
| 2005/0289123 A1* | 12/2005 | Dettinger | G06F 17/30864 |
| 2006/0031195 A1* | 2/2006 | Patterson | G06F 17/30613 |
| 2006/0143236 A1* | 6/2006 | Wu | 707/104.1 |
| 2008/0109472 A1* | 5/2008 | Underwood | G06F 17/3089 |
| 2009/0164517 A1* | 6/2009 | Shields | H04L 63/1425 |
| 2009/0265346 A1* | 10/2009 | Kadayam et al. | 707/5 |
| 2013/0031083 A1* | 1/2013 | Madhavan | G06F 17/30864 707/713 |

FOREIGN PATENT DOCUMENTS

| JP | 2003-208434 | 7/2003 |
|---|---|---|
| JP | 2006-189980 | 7/2006 |

OTHER PUBLICATIONS

Lu, J. et al., Federated Search of Text-Based Digital Libraries in Hierarchical Peer-to-Peer Networks, Information Retrieval, Sep. 2006, vol. 9, Issue 4, pp. 477-498, ISSN: 1386-4564.
Goncalves, M. A., France, R. K. et al., Marian Searching and Querying across Heterogeneous Federated Digital Libraries, In: Proc. of First DELOS Workshop on "Information Seeking, Searching and Querying in Digital Libraries", Dec. 11, 2000.
PCT/US2009/004308: Application as filed, Jul. 23, 2009, 47 pages.

(Continued)

Primary Examiner — Cam-Y Truong
(74) Attorney, Agent, or Firm — Berkeley Law & Technology Group, LLP

(57) ABSTRACT

The subject matter disclosed herein relates to web searching protocols. In a particular implementation, one or more federated searches may be indexed accordance with index criteria. A query may be compared to one or more index criterion. The query may be matched with index criteria. One or more indexed federated searches associated with index criteria associated with the query may be provided.

19 Claims, 11 Drawing Sheets

(56) References Cited

OTHER PUBLICATIONS

PCT/US2009/004308: Initial publication without ISR, dated Feb. 4, 2010, 39 pages.
PCT/US2009/004308: International Search Report, dated Feb. 26, 2010, 6 pages.
PCT/US2009/004308: Later publication of ISR, dated Apr. 15, 2010, 6 pages.
PCT/US2009/004308: Written Opinion of the ISA, dated Jan. 28, 2011, 4 pages.
PCT/US2009/004308: International Preliminary Report of Patentability, dated Feb. 1, 2011, 5 pages.
EP09803247.7: Entry into the European phase, Feb. 3, 2011, 4 pages.
EP09803247.7: Rule 161(2) and 162 EPC communication, Mar. 9, 2011, 2 pages.
EP09803247.7: Article 67(3) Communication, Apr. 13, 2011, 1 page.
EP09803247.7: Claim Amendments in response to Rule 161(2) EPC communication, Apr. 18, 2011, 10 pages.
TW App. 20090123017 / Application as filed Jul. 28, 2008, 22 pages.
TW App. 20090123017 / Publication TW201011582, published Mar. 16, 2010.
TW App. 20090123017 / First Office Action, dated Mar. 19, 2013, English translation, 12 pages.
KR App. 20117002156 / First Office Action, 19 pages, dated Oct. 4, 2017.
KR App. 20117002156 / Publication KR101337839, published Dec. 6, 2014, 24 pages.
KR App. 20117002156 / Publication of Patent, English Translation, 2 pages, Oct. 4, 2017.
JP App. 20110521113 / Publication JP2011529602, published Dec. 8, 2011, 26 pages.
JP App. 20110521113 / First Office Action, dated Aug. 6, 2013, English Translation, 3 pages.
CN App. 20171109951/ Application as filed Feb. 27, 2017, 42 pages.
CN App. 20098128749 / Publication CN102105879, 26 pages, Oct. 4, 2017.
CN App. 20098128749 / First Office Action, dated Sep. 10, 2012, with English translation, 20 pages.
CN App. 20098128749 / Invention Patent Certificate, Mar. 29, 2017, 3 pages.
AU App. 2009277143 / filed Jul. 23, 2009, 44 pages.

* cited by examiner

FEDERATED COMMUNITY SEARCH

BACKGROUND

1. Field

The subject matter disclosed herein relates to web searching protocols.

2. Information

In traditional Internet search engines such as Google, only data sources that have been searched and indexed by a search engine's crawler technology may be searched, retrieved and accessed by a user. When a user queries a traditional search engine the user is typically not searching the Internet as a whole but is actually searching the search engine's index for matches to a query and subsequent access to the data sources. Examples of data sources include webpages and databases, but not limited thereto. Search results from such so-called crawler-based searches have numerous limitations. For example, search results may be significantly out of date depending on the schedule and time it takes for a search engine's crawler technology to update the index for a particular website. Further, a significant amount of data may be contained in databases and web pages that may not be accessible to traditional Internet search engines because of limitations in crawler technology and access restrictions.

Federated searching is different from traditional crawler-based searching. A federated search may be defined by it's creator to search for data in a predefined set of data sources. Federated searches allow users to search multiple data sources with a single query from a single user interface. The user may enter a search query in interface's search box and the query may be sent to every data source defined in the federated search. Since a federated search typically includes a targeted set of data sources, the accuracy and relevance of individual searches may be improved for a given query. Further, the amount of time required to search the targeted data sources may be reduced over those searches provided by crawler-based search engines. The relevance of the resulting search results typically depend on the relevance of the data sources included in a particular federated search. Additionally, federated searches are typically inherently as current as the individual data sources because they are searched in real time.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "obtaining," "hosting," "maintaining," "representing," "modifying," "receiving," "transmitting," "establishing," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium. Further, unless specifically stated otherwise, process described herein, with reference to flow diagrams or otherwise, may also be executed and/or controlled, in whole or in part, by such a computing platform.

Figure 1:
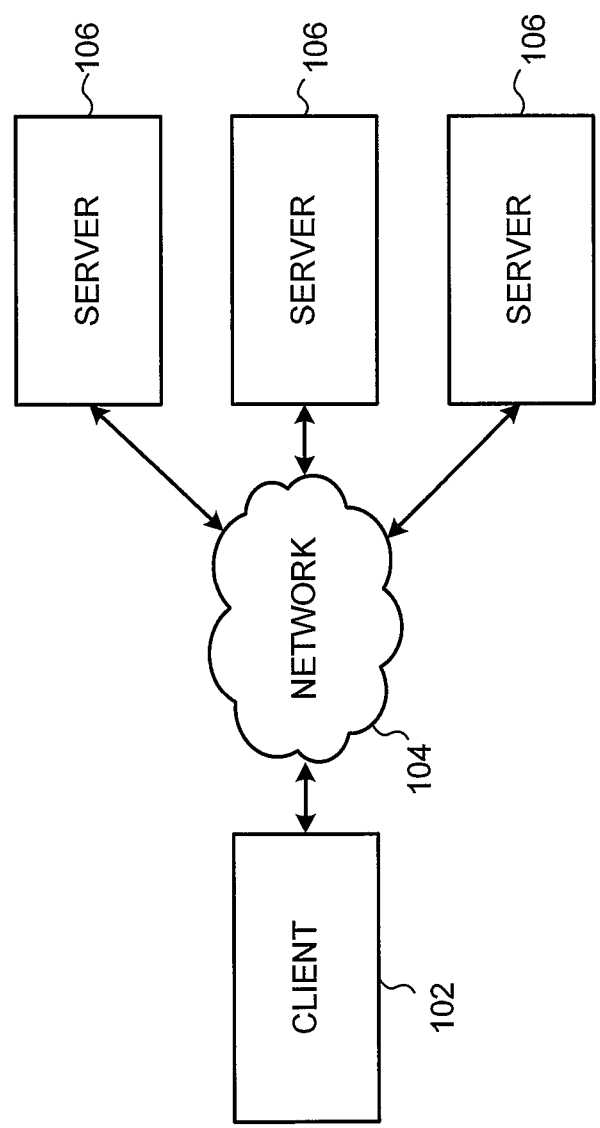
FIG. 1 is a schematic diagram of a system that is capable of establishing a session between a client and one or more servers over a network.

FIG. 1 is a schematic diagram of a system 100 that is capable of establishing a session between a client 102 and one or more servers 106 over a network 104. Network 104 may employ data links (not shown) comprising one or more data transmission mediums such as, for example, cabling (e.g., fiber optic, twisted wire pair, coaxial), satellite transmission links or terrestrial wireless transmission links. However, these are merely examples of data transmission media that may be used for transmitting information in a network and claimed subject matter is not limited in this respect. Additionally, network 104 may employ one or more communication protocols for transmitting information between a source and a destination such as, for example, an Internet Protocol (IP), asynchronous transfer mode (ATM) and/or communication protocols adapted for use on wireless transmission links. However, these are merely examples of communication protocols that may be used for transmitting information between a source and a destination in a network and claimed subject matter is not limited in these respects. In particular embodiments, network 104 may comprise one or more network topologies and/or configurations such as, for example, one or more local area networks, one or more Intranets, the Internet, wireless carrier infrastructure Internet versus Intranet, and/or wireless carrier infrastructure, just to name a few examples. While particular examples provided herein establish a session between a client and server, it should be understood that such implementations are merely examples provided for the purpose of illustration and claimed subject matter is not limited to such implementations. For example, a session may also be established between peer devices and/or processes over network 104.

Client 102 may comprise one or more processes hosted on a computing platform that is communicatively coupled to network 104 by a communication adapter (not shown). Similarly, servers 106 may comprise processes hosted on one or more computing platforms connected to network 104 by an associated communication adapter. In particular embodiments, each server 106 may be hosted on its own associated computing platform which is distinct from computing platforms hosting other servers 106. Alternatively, two or more servers may be hosted on a single computing platform.

Client 102 may initiate a session with a server 106 to provide a service by, for example, establishing a session through which client 102 and server 106 may communicate over network 104. Client 102 may comprise any one of several application programs hosted on a computing platform such as, for example, email applications, web browsers, document processing programs, media players, and/or the like. Here, it should be understood that client 102 may be hosted and/or executed on any one of several devices capable of communicating with a network such as, for example, personal computers, mobile telephones, personal digital assistants, just to name a few examples. In particular embodiments, although claimed subject matter is not limited in this respect, a server may comprise a print server adapted to process print jobs, web server, email server, content server adapted to distribute audio or video content (e.g., through streaming). In a particular embodiment, servers 106 may be addressable through a single socket address. A socket address may comprise, for example, information combining an IP address and a UDP port number.

A crawler-based search engine as referred to herein relates to search engines that utilize crawler technology to search web accessible data sources and index the search results. Search results in answer to a query may be extracted from the contents of the index and not the entire World Wide Web as a whole. Search results may include a list of links to web pages containing information deemed relevant to the query. Crawler-based search engines may provide search results after the user has entered a query into a query field and issues the query by clicking "Search," "Enter," "Go" or another initiating input command. Such a query may be compared with an index of search results that were gathered previously by the crawler technology. Search results obtained in this way may include a large number of "hits" (e.g., web page links) that may not be fully relevant to the purpose of the query.

Figure 2:
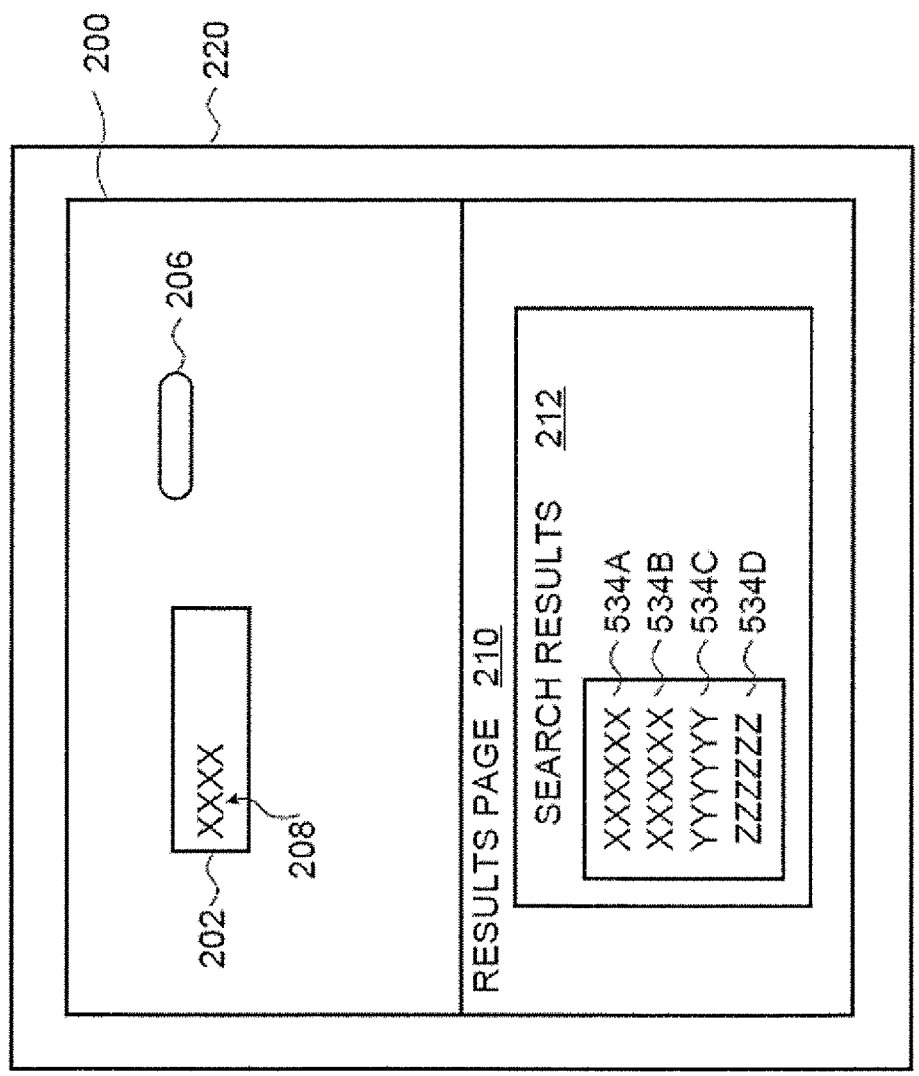
FIG. 2 illustrates a web browser as displayed on display device, according to an embodiment.

FIG. 2 illustrates web browser 200 as displayed on display device 220, according to an embodiment. Display device 220 may be a component of computing platform hosting a client, for example, but not limited thereto. A user, via web browser 200, may enter characters into query field 202 which constitutes query 208. Search button 206 may be selected to communicate query 208 to a search engine (not shown) for processing. Such a search engine may be implemented on a server, for example, but not limited thereto.

Here, such a search engine may compile search results 212 relevant to the subject matter of query 208 based on the contents of a crawler-based indexed search. The search engine may then communicate search results 212 to display device 220. Search results 212 may be presented on display device 220 in results page 210 in web browser 200.

In one embodiment, searcher may find data sources that he believes provide highly relevant and useful search results for particular query subject matter. Such search results may include links to websites, web pages, or databases, just to name a few examples. The searcher may create what is referred to as a "federated search" that is operable to search those particular data sources contained therein. A federated search may be saved in an electronic file available to be used for future searches on subject matter relevant to the subject of the query.

A federated search created by a searcher may not only contain search results that were discovered using crawler-type search results, but also may include search results not crawled. A creator of a federated search may have access to databases that are not necessarily available to the public or searchable or indexable by a crawler. In one embodiment, searcher may include these databases in a federated search. A federated search may provide links to otherwise inaccessible databases for the convenience of the searcher having permissions to that database. Also, a federated search may contain relative syntax to provide access to the particular otherwise inaccessible databases.

Figure 3:
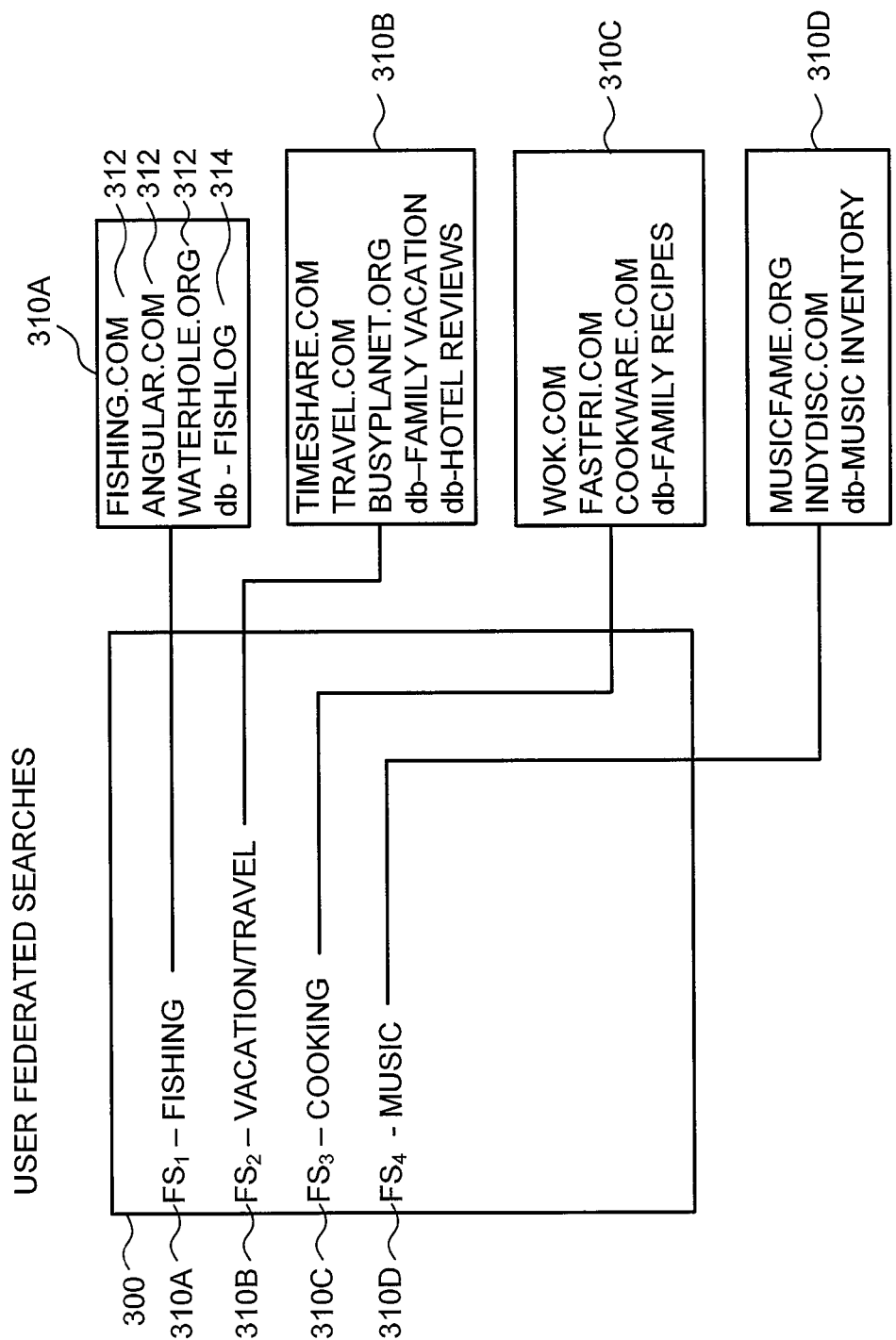
FIG. 3 is a diagram that illustrates an example of a federated search library, in accordance with an embodiment.

FIG. 3 is a diagram that illustrates an example of federated search library 300, in accordance with an embodiment. Federated search library 300 is an electronic library containing one or more federated searches 310A-D. First federated search 310A comprises a plurality of data sources including websites 312 and database 314. By way of illustration and example, but not limited there to, first federated search 310A may be relevant to the subject of fishing. The data sources may include websites 312 related to the subject of fishing and database 314 may comprise a personal log of all of the types of fish caught by the user. Other federated searches 310B-D may be diverted to other subject matter of interest to the searcher.

Referring again to FIG. 2, web browser 200 may be enabled for searching federated searches, in accordance with an embodiment. A user, via web browser 200, enters characters which constitutes query 208 into query field 202. Search button 206 may be used to select a specific federated search to be used for this search. The search based on query 208 may be performed at each of the data sources contained in the federated search. Search results 212 may be presented on display device 220 as results page 210, for example.

In accordance with an embodiment, a creator of a federated search may publish the federated search for others to use. Each of the user's federated searches may be uploaded to a server, for example, that is accessible by other users. In this way, federated searches may be shared and a community of federated search providers providing a community library of federated searches may be established. In addition, certain creators of federated searches may develop a reputation within the community for being an expert in a particular query subject matter and has provided especially relevant and trusted federated searches in that area. As such, searchers may seek out a particular federated search creator for a particular federated search for a given query subject matter.

In accordance with an embodiment, a library of federated searches may be stored by and accessible by a web search engine. The federated searches within the library may be indexed by the web search engine so as to be more accessible to searchers.

Figure 4:
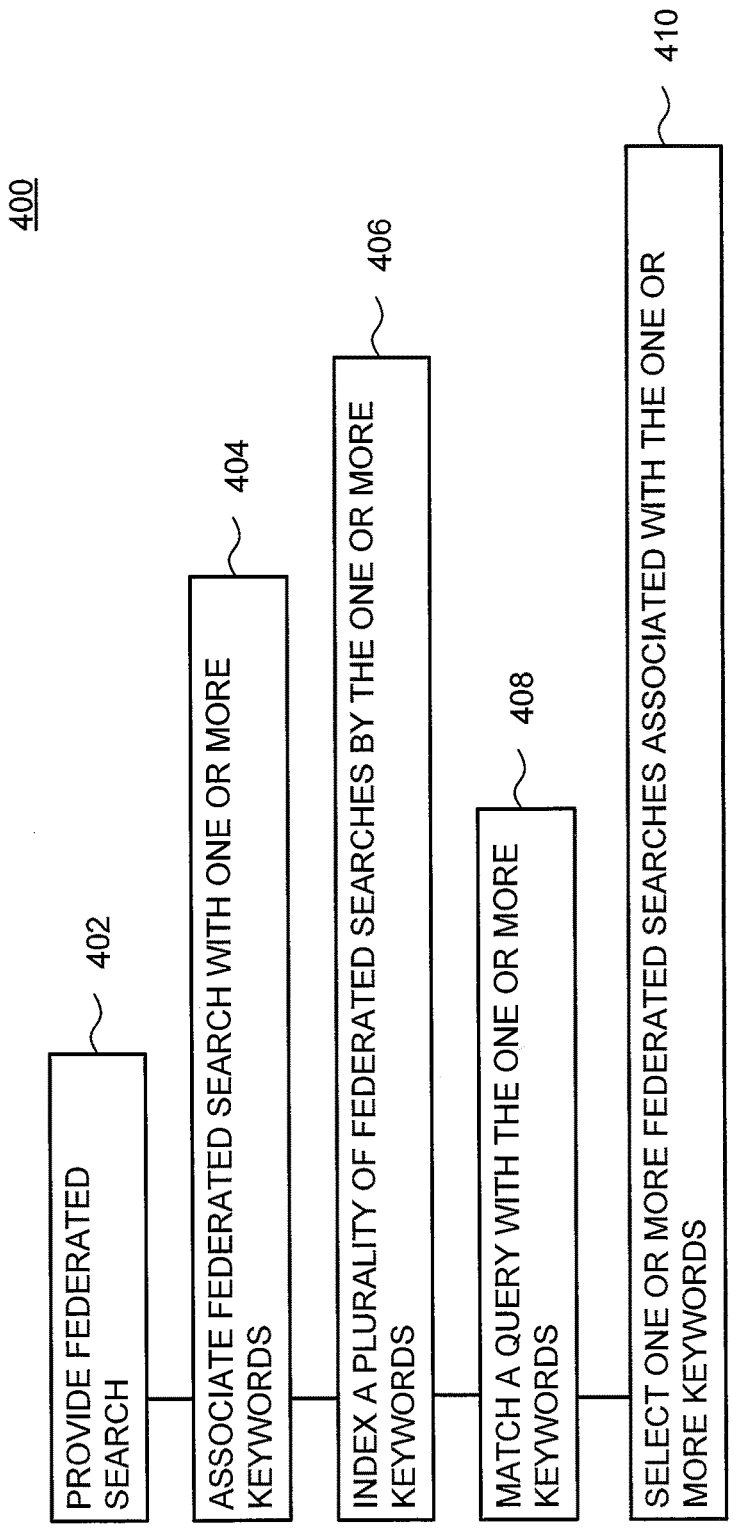
FIG. 4 is a flow diagram of an embodiment of a method for processing federated searches.

FIG. 4 is a flow diagram of embodiment 400 of a method for processing federated searches. Each federated search may be provided to a search engine 402 along with one or more associated keywords 404. The keywords may be provided by the federated search provider, for example. Each federated search may be indexed in accordance with each of the associated keywords 406.

In accordance with an implementation of a search for a federated search, a query may be compared to and matched with one or more keywords 408. One or more federated searches associated with the one or more keywords may be provided as search results for that query 410.

Figure 5:
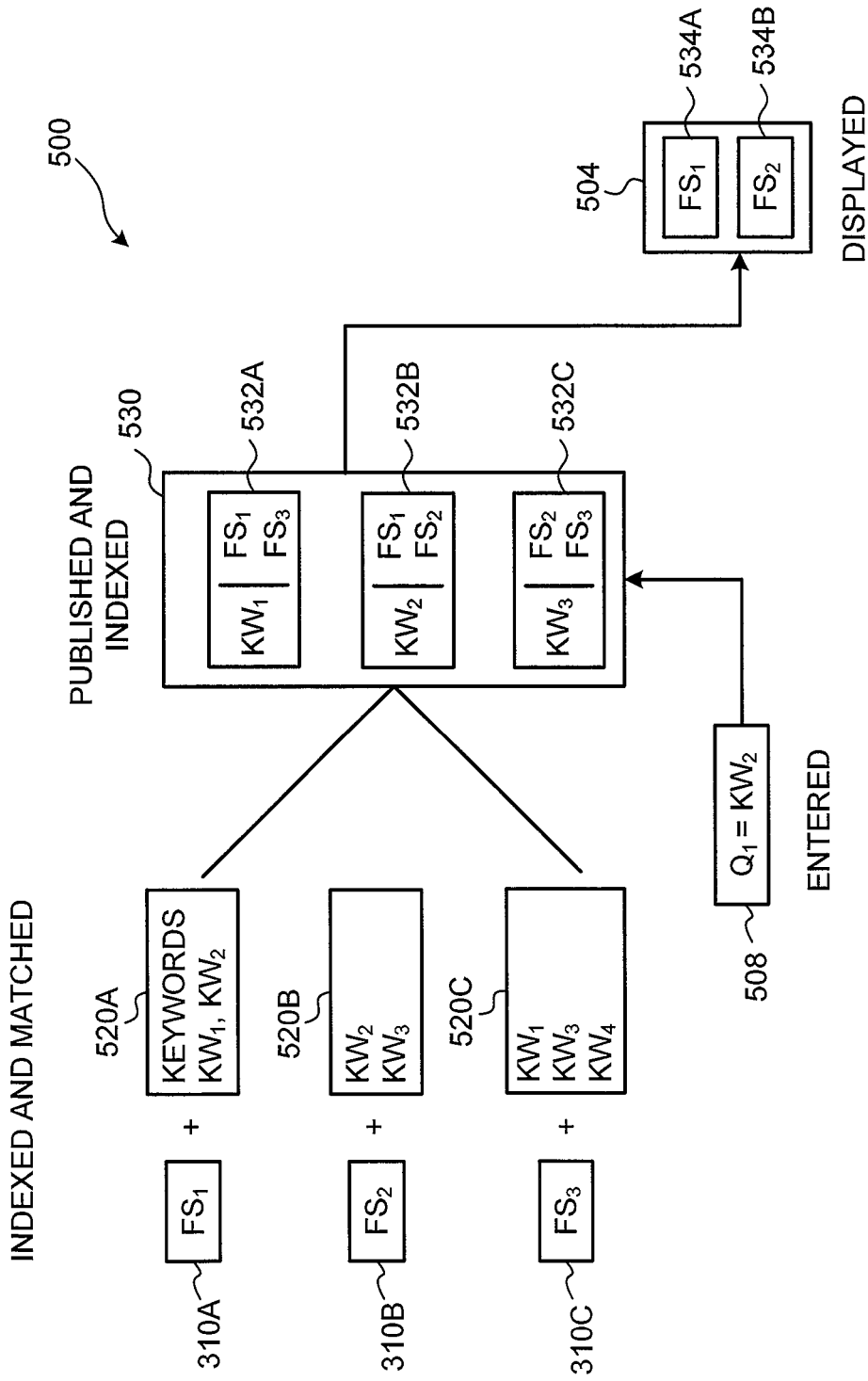
FIG. 5 is a diagram of an embodiment providing a possible graphical representation of an embodiment of a method for processing federated searches.

FIG. 5 is a diagram of embodiment 500 providing an example graphical representation of embodiment 400 of a method for processing federated searches. Each federated search 310A-C may be associated with one or more keywords 520A-C, respectively. Each federated search 310A-C may be communicated and stored in a federated search library 530. Each federated search may be indexed in accordance with each of the keywords into keyword associations 532A-C. Each keyword association 532A-C may comprise a keyword and one or more federated searches associated with that keyword.

Query 508 may be communicated to a search engine (not shown) and may be compared to and matched with the keyword in each keyword association 532A-C. Federated searches 534A-B associated with matching keywords may be provided to a results page 504 as search results for use by a searcher to perform a federated search using one or more of the provided federated searches 534A-B.

Referring again to FIG. 2, results page 210 may present the user with search results 104 including federated searches 534A-D. The user may select a federated search 534A-D of interest. Upon selection of a federated search 534A-D, a federated search request is communicated to a search engine with the query 208. Here, such a search engine may use the query to perform a search in the data sources associated with the selected federated search 534A-D. The search engine may communicate federated search results 212 to the browser 200 for initiating display on display device 220. Federated search results 212 may be presented on the browser 200 in results page 210, for example.

Matching of query 208 to keywords may be affected using any process suitable for selecting relevant federated searches from the federated search library. For example, in an embodiment, an exact match process may be utilized wherein the query must match exactly, or a close derivation, the keyword. In accordance with another embodiment, query 208 may be compared with synonyms of keywords, and visa versa. Other matching processes are described below. However these are merely examples and the implementations are not limited thereto.

Figure 6:
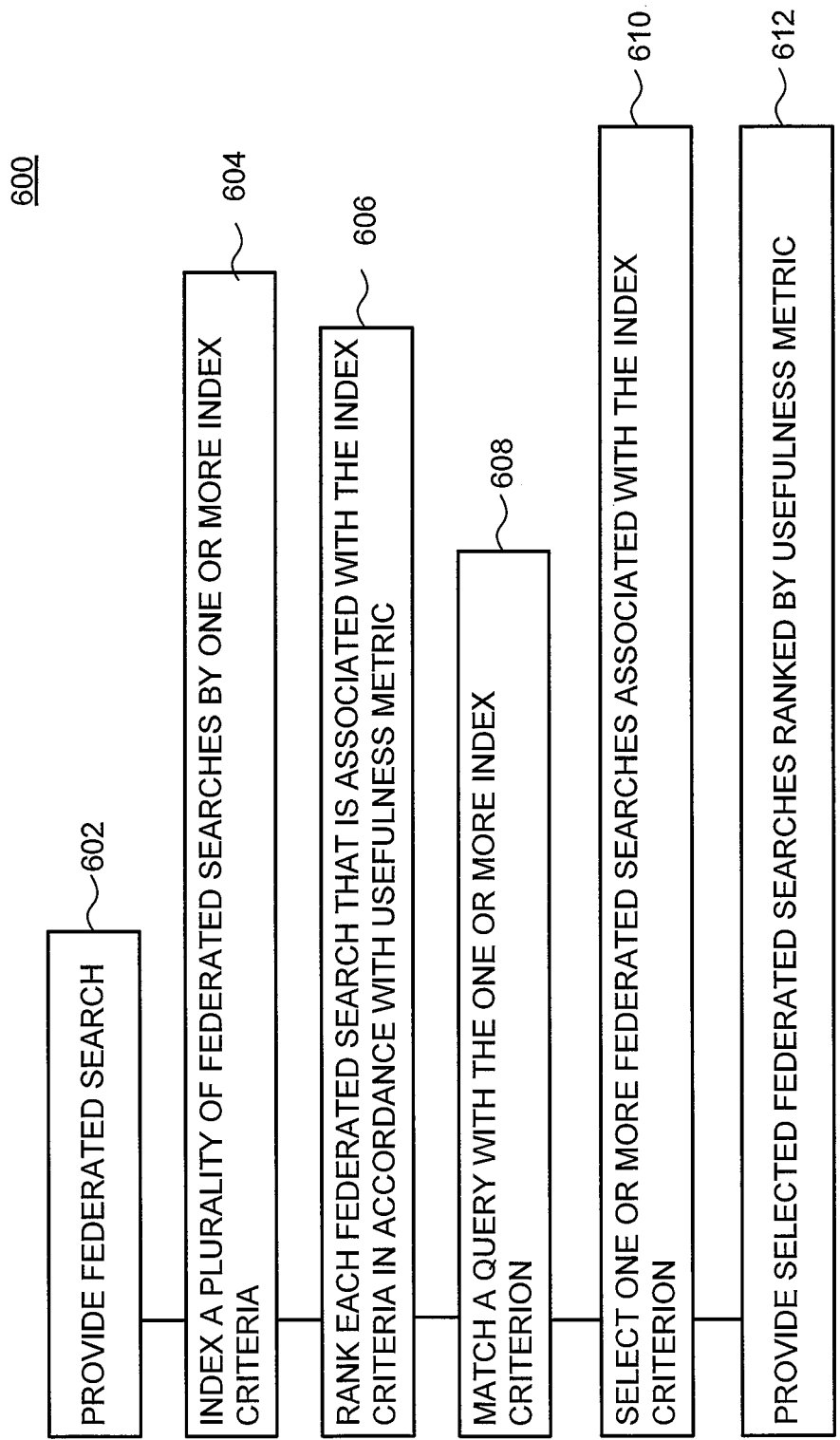
FIG. 6 is a flow diagram of an embodiment of a method for processing federated searches.

FIG. 6 is a flow diagram of embodiment 600 of a method for processing federated searches. Each federated search may be provided to a search engine 602. Each federated search may be indexed in accordance with one or more index criteria 404. Index criteria may include any criteria suitable to index the federated searches. Index criteria may include any or a combination of key words, subject matter, title, and/or data source, but not limited thereto.

Further, each federated search that is associated with particular index criteria may be ranked in accordance with usefulness metric 606. Usefulness metric may include any metric that may be used to rank each federated search. Usefulness metric may, for example, be related to, the relevance and/or quality of a federated search for its purported subject matter.

By way of example, a relevance metric may include measurable indicators so as to determine a level of relevance of a federated search for a particular index criterion. In a particular example, wherein an index criterion may be a keyword, a relevance metric may comprise the number of data sources identified in the federated search having an association with the same or similar keyword. However this is merely an example and the implementations are not limited thereto.

By way of another example, a usefulness metric may be associated with user ratings. According to an embodiment, user rating may include, for example, an average rating given to a particular federated search based on perceived usefulness of the federated search for a particular index criterion. Such a user ratings may provide an indication of the quality of a particular federated search. Certain federated searches may be found to be particularly valuable for use with processing a query associated with a particular index criterion. These particularly valuable federated searches may be presented to a user with an indicator. However this is merely an example and the implementations are not limited thereto.

In one embodiment, ranking in accordance with usefulness metric 606 may be provided to a searcher with an indicator. For example, an indicator of rank may be in the form of presenting a list of associated federated searches with the highest ranked federated searches presented at the top of the list. In another example, each federated search may be provided with an indicator, such as a percentage value of relevance and/or a star ranking, wherein five stars may indicate a high ranking and one star a low ranking. However these are merely examples and implementations are not limited thereto.

In accordance with an implementation of a search for a federated search, a query may be compared to and matched with one or more index criterion 608. One or more federated searches associated with the one or more index criterion may be selected as search results for that query 610. The selected federated searches may be ranked in accordance with one or more usefulness metrics. Each ranked federated search may be provided to a user having an indicator of rank.

Figure 7:
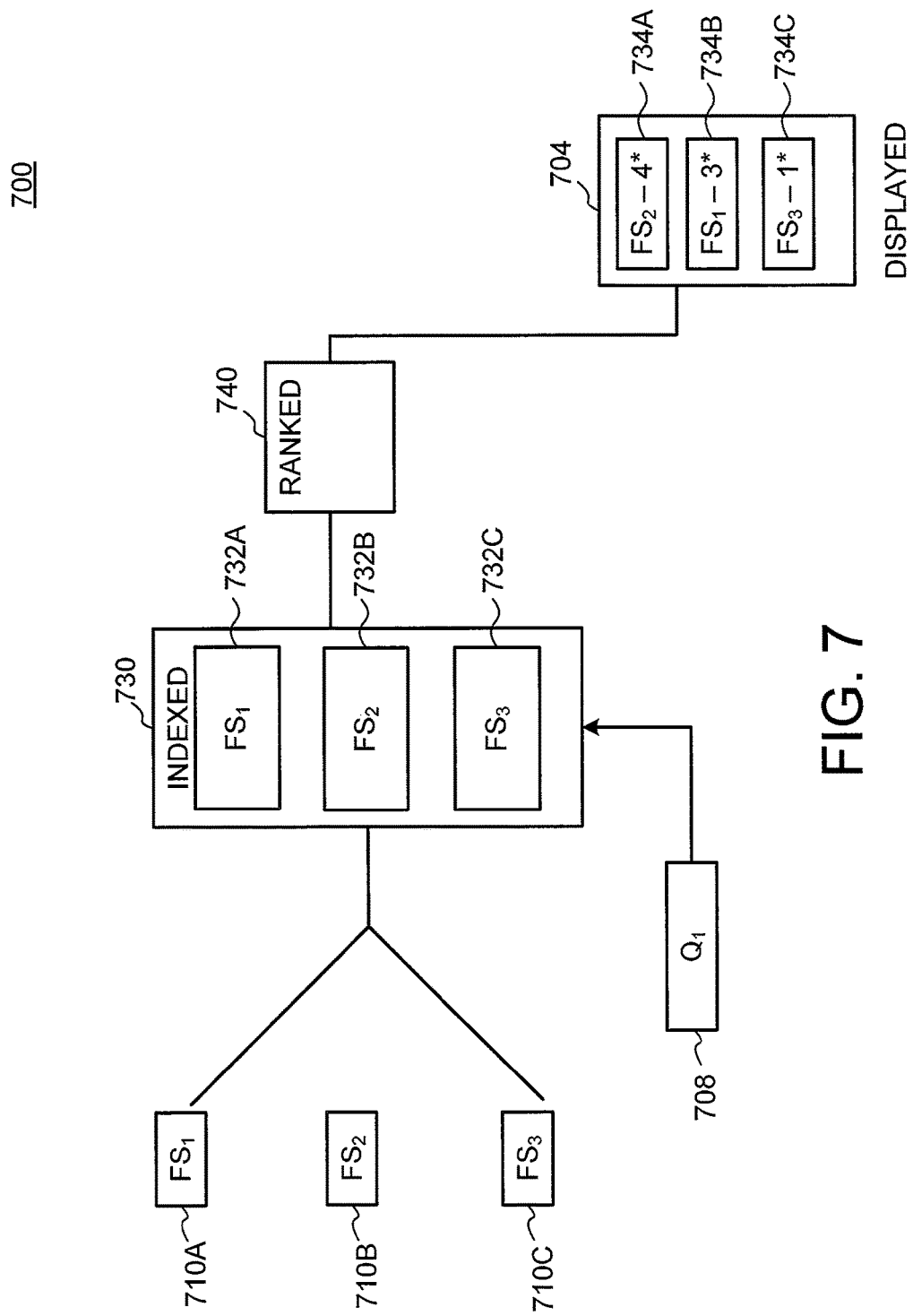
FIG. 7 is a diagram of an embodiment providing a possible graphical representation of an embodiment of a method for processing federated searches.

FIG. 7 is a schematic diagram of embodiment 700 to provide an example graphical representation of embodiment 600 of a method for processing federated searches. Each federated search 710A-C may be communicated and stored in federated search library 730. Each federated search may be indexed in accordance with index criteria into index associations 732A-C. Each index association 732A-C may comprise one or more index criteria and one or more federated searches associated with the one or more index criteria.

Query 708 may be communicated to a search engine and may be compared to and matched with an index criterion in each index association 732A-C. Federated searches associated with matching index criterion may be ranked by a ranking engine 740 in accordance with one or more usefulness metrics. Indexed and ranked federated searches 734A-C may be provided as search results in a results page 704 for use by a searcher to perform a federated search using one or more of the provided federated searches 734A-C. Each federated search 734A-C may be provided to a user having an indicator of rank.

The matching of query 708 to index criteria may be affected using any process suitable for indexing and matching relevant federated searches from the federated search library 730. As described above, indexing and matching may be based on index criteria that comprise any criteria suitable to index and match the federated searches. Index criteria may include any or a combination of key words, subject matter, title, and/or data source, but not limited thereto. By way of further example, domains found in a crawler-based search may be matched with domains in the federated searches. By way of another example, domains in a federated search may be matched against domains in a search engine's directory that returns a category path, which in turn, may be matched against a category path obtained from a crawler-based search. By way of yet another example, matching may be based at least in part on matching domains in a federated search to a domain defined by a query. It is appreciated that index criteria and matching may be used singularly or in combination. However these are merely examples and the implementations are not limited thereto.

If a user is not interested in the search results based on a chosen federated search, the user may select another federated search having a lower ranking. If a user selects a different federated search from the search results, the search results may then updated to display the search results that pertain to the different federated search in the results page.

Figure 8:
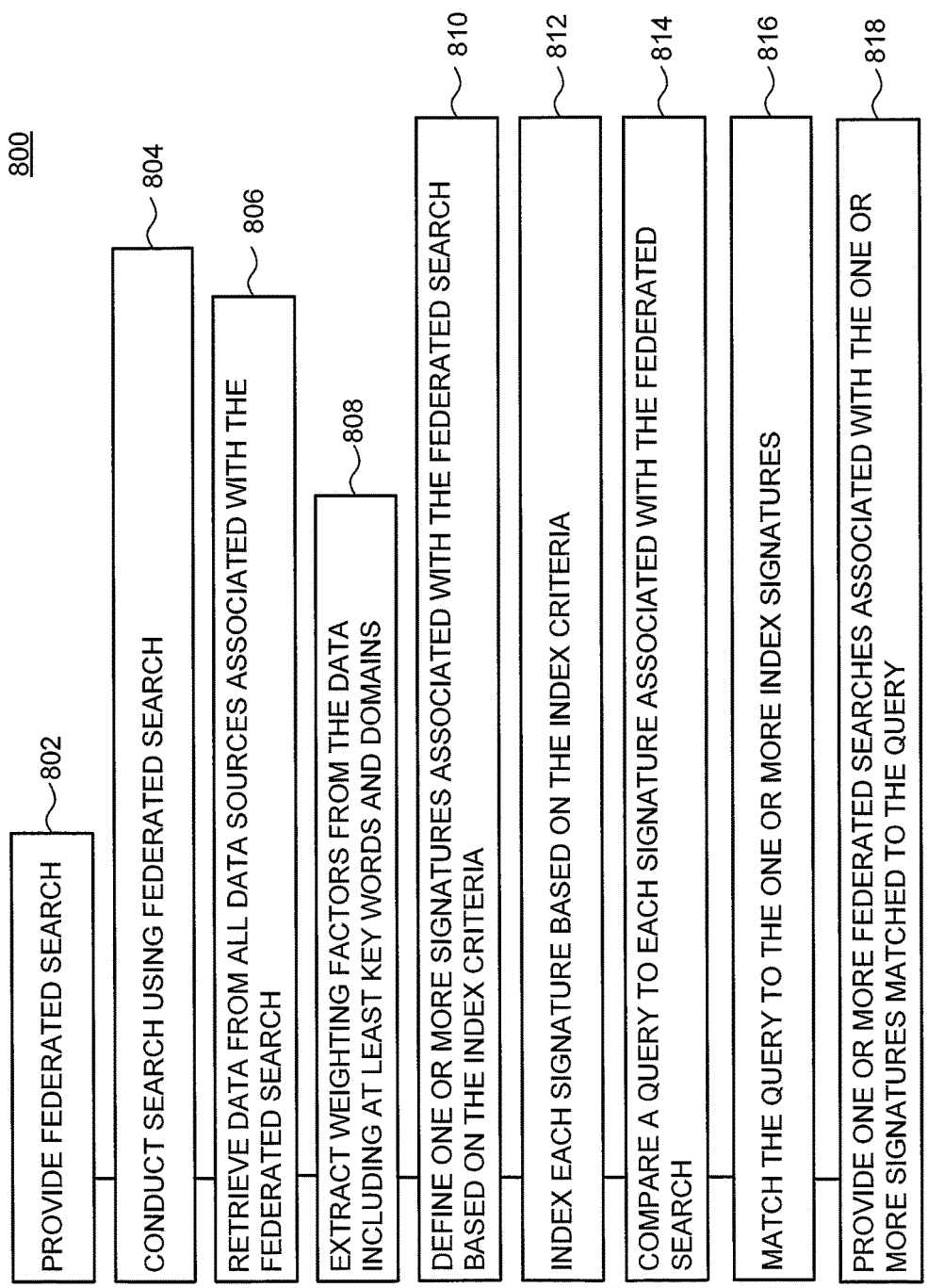
FIG. 8 is a flow diagram of an embodiment of a method for processing federated searches.

FIG. 8 is a flow diagram of embodiment 800 of a method for processing federated searches. Each federated search may be provided to a search engine 802. A search may be performed using the data sources included in each federated search 804. The search of the data sources may be by any suitable method for extracting data from the data sources. By way of example, a plurality of queries may be used to search the data sources in order to extract data related to each of the queries. However this is merely an example implementation, and claimed subject is not limited thereto.

Data may be retrieved from the data sources associated with federated search 806. Weighing factors may be parsed from such data that may be suitable for indexing. By way of example, but not limited thereto, weighting factors may include key words and/or domains. One or more signatures may be defined that associate a federated search with weighting factors that are associated with the data derived by searching the data sources of the federated search 810.

Each signature may be indexed in accordance with one or more index criteria 812. Index criteria may include any criteria suitable to index the federated searches. Index criteria may include any or a combination of key words, subject matter, title, and/or data source, just to name a few examples.

In accordance with an implementation of a search for a federated search, a query may be compared to one or more index criterion 608 associated with the signatures 814. Such a query may be matched with one or more signatures 816. The one or more federated searches associated with the one or more signatures may be provided to a user 818.

It is appreciated that in the embodiments provided above, the selected federated searches may be ranked in accordance with one or more usefulness metrics, as provided above, before being presented to the user.

Figure 9:
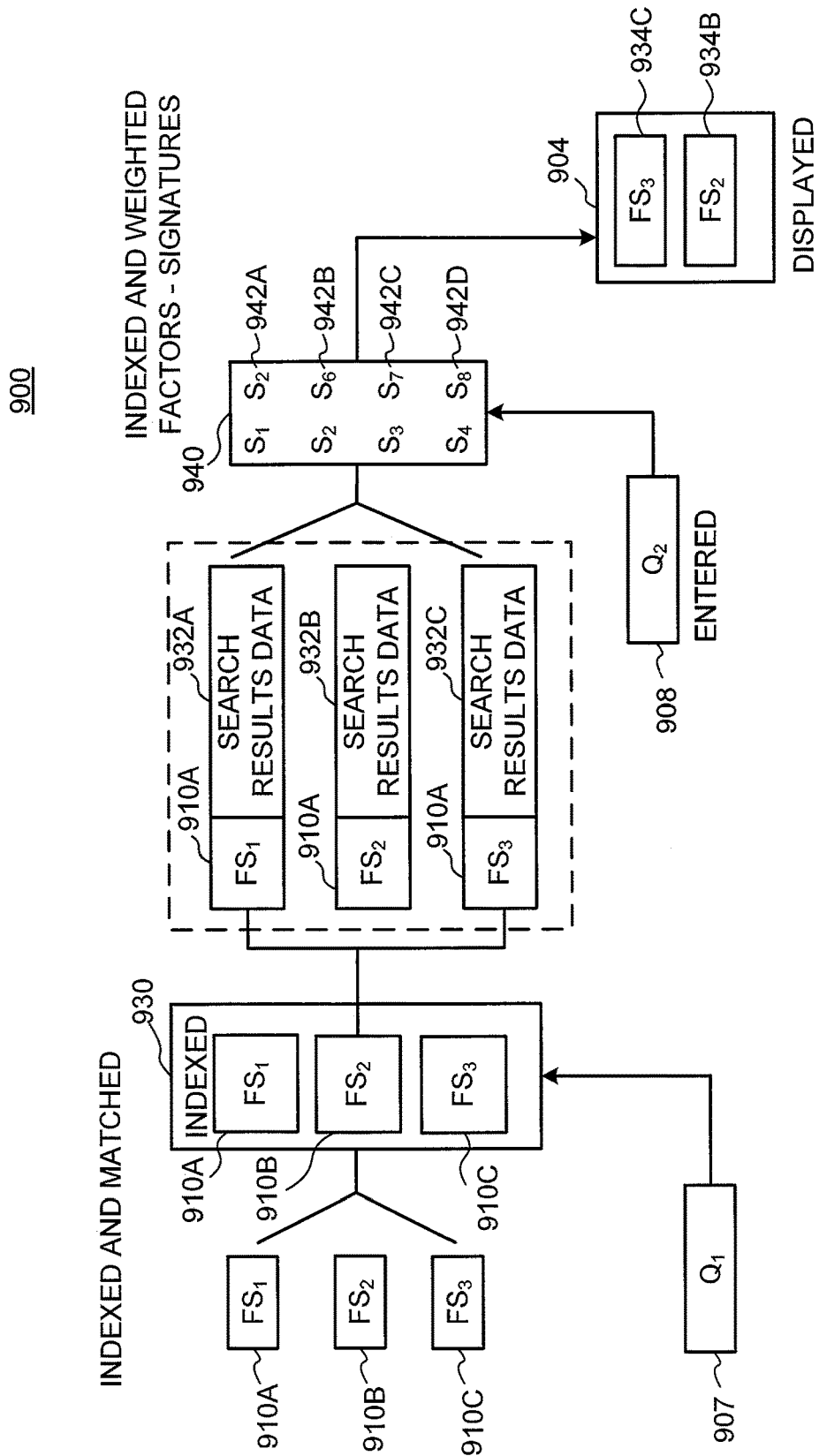
FIG. 9 is a diagram of an embodiment providing a graphical representation of an embodiment of a method for processing federated searches.

FIG. 9 is a diagram of embodiment 900 providing an example graphical representation of embodiment 800 of a method for processing federated searches. Each federated search 910A-C may be communicated and stored in federated search library 930. Each of the data sources of each federated search 910A-C may be searched providing search data 932A-C associated with the federated search 910A-C. In an embodiment, by way of example and not limitation, each data source may be searched based on an initial query 907. The federated search 910A-C and associated search data 932A-C may be communicated to and stored in search results library 950. Weighing factors are extracted from the search data 932A-C. Signatures 942A-n may be defined by associating weighting factors with a respective federated search 910A-C. Signatures 942A-C may be indexed using index criteria in a signature library 940.

Each signature 942A-C may be indexed in accordance with index criteria into index associations 942A-C. Each index association 942A-C may comprise one or more index criteria and one or more signatures 942A-C associated with the one or more index criteria.

Query 908 may be communicated to a search engine and may be compared to and matched with index criteria in each index association 934A-C. Corresponding signatures 942A-C associated with matching index criterion may be ranked by a ranking engine (not shown) in accordance with one or more usefulness metrics, in accordance with an embodiment. Federated searches 934A-C corresponding to signatures 942A-C associated with matching index criteria are determined. Federated searches 934A-C may be provided as search results in a results page 904 for use by a searcher to perform a federated search using one or more of the provided federated searches 934A-C.

The matching of query 908 to index criteria may be affected using any process suitable for indexing and matching relevant signatures and corresponding federated searches from signature library 930, as provided above.

A search engine may offer relevant federated searches to a searcher in addition to or as an alternative to crawler-based search results provided by the search engine, in accordance with an embodiment. If a user is not interested in the search results based on a federated search, the user may select another federated search having a lower ranking or may choose to view search results provided by a crawler-based search. If a user selects a different federated search in the list, the search results may then updated to display the search results that pertain to the different federated search.

Figure 10:
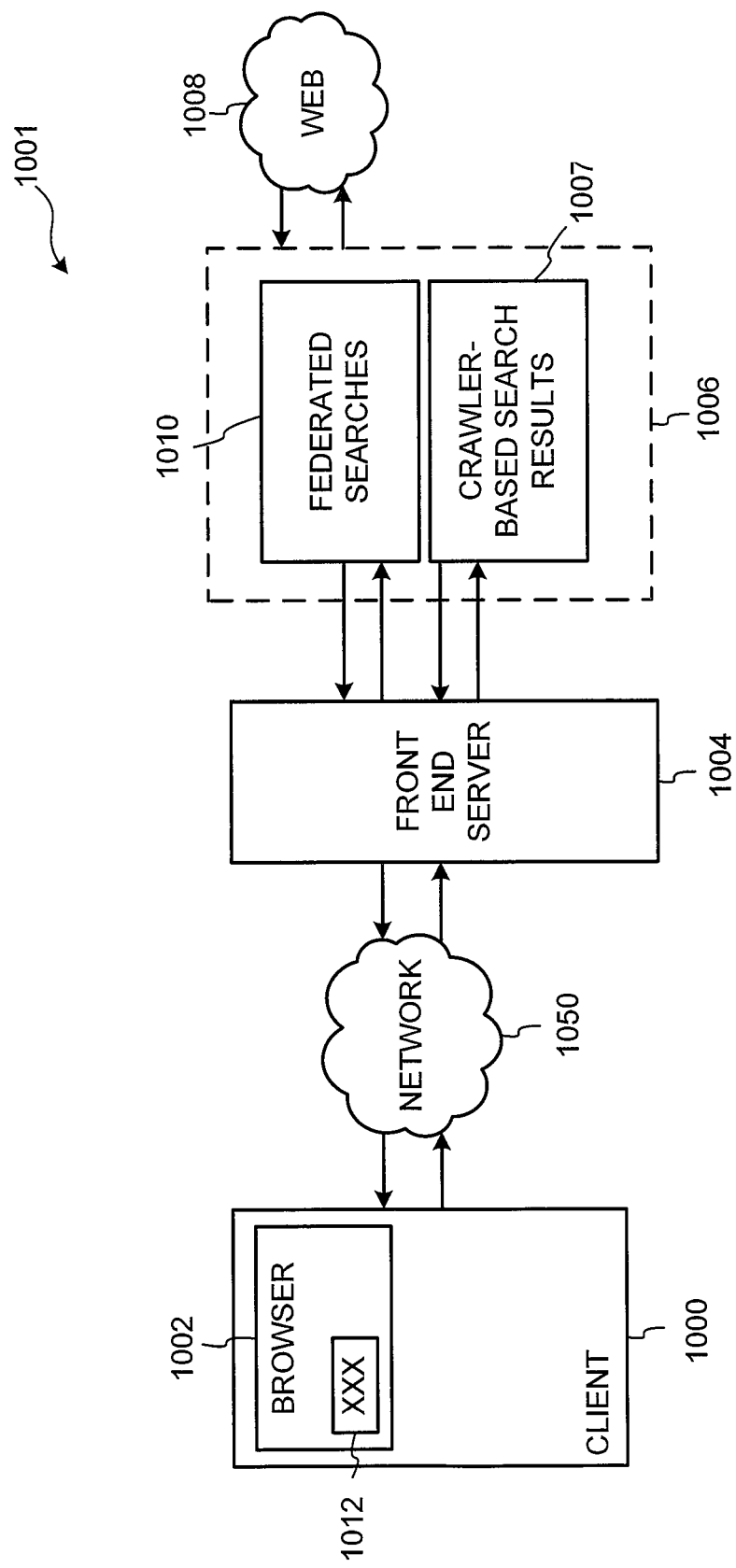
FIG. 10 is a diagram providing a graphical representation of an embodiment of a system for processing federated searches.

FIG. 10 is a diagram providing an example graphical representation of embodiment 1001 of a system for processing federated searches. Embodiment 1001 comprises a browser 1006 operable to provide search results based on federated searches and/or crawler-based searches. Query 1012 may be entered in web browser 1002 on client 1000 by a user. Query 1012 may be communicated to front end server 1004 over network 1050. Front end server 1004 and network 1050 may not be required elements in any embodiment, but are merely illustrated to show one approach in which the embodiment 1001 may be implemented. Network 1050 may be a local area network (LAN), a wide area network (WAN), or the Internet, but not limited thereto. Front end server 1004 may be operable to communicate query 1012 to search engine 1006, which may be operable to process query 1012.

Search engine 1006 may comprise crawler-based search engine 1007 and federated search engine 1010. Crawler-based search engine 1007 may be operable to provide crawler-based search results as described above. Crawler-based search engine 1007 may be operable to communicate the search results to front end server 1004 for communication with client 1000.

Front end server 1004 and search engine 1006 may be implemented on the same or different device. However, for the purpose of illustration, they are shown as residing on different devices.

Federated search engine 1010 may comprise a database of one or more indexed federated searches. Federated search engine 1010 may be operable to determine a set of one or more indexed federated searches based on query 1012.

Federated search engine 1010 may be operable to communicate the set of indexed federated searches to front end server 1004. In accordance with an embodiment, search engine 1006 may be operable to communicate, in addition to the set of indexed federated searches, additional data indicating which of the indexed federated searches are most relevant.

Front end server 1004 may be operable to communicate a list of indexed federated searches and relevancy data to client 1000 over network 1050 for initiating display on web browser 1002. Front end server 1004 may be operable to communicate the search results based on the crawler-based search to client 1000 over network 1050 for display on web browser 1002.

In accordance with an embodiment, a user may be presented with a choice of selecting search results based on a crawler-based search or one of the indexed federated searches.

Upon selection of an indexed federated search of interest to the user, web browser 1002 may be operable to communicate the selected indexed federated search over network 1050 to front end server 1004, which may be operable to communicate the selected indexed federated search to search engine 1008. Search engine 1008 may be operable to process the selected indexed federated search to obtain federated search results. The federated search results may be communicated to front end server 1004. Front end server 1004 may be operable to communicate the federated search results 1018 to client 1000 over network 1050 for initiating display in web browser 1002.

One advantage of the above implementation is that a list of relevant indexed federated searches are communicated to the user with the standard crawler search results, and provided as an alternative to the standard crawler results. However, this implementation also illustrates the possibility that for every query entered into query field 1012 of web browser 1002, there may be two complete round trips that a search request has to make between client 1000 and front end server 1004.

In accordance with another implementation, federated search results of a highest ranking indexed federated search based on a query may be communicated to web browser 1002 by default. In this implementation, the user may receive relevant search results with the query having made only one round trip.

In accordance with another implementation, search engine 1006 may be operable to process a selected indexed federated search to obtain federated search results. The federated search results may be communicated to front end server 1004. Front end server 1004 may be operable to communicate both a list of federated searches and search results based on either an indexed federated search or a standard crawler-based search to client 1000 over network 1050.

In the absence of front end server 1004, web browser 1002 may be operable to communicate the federated search to the web 1008, which subsequently may be operable to return federated search results to client 1000 over network 1050.

One advantage of this implementation is that there may be less communication (i.e., traffic) between client 1000 and front end server 1004. However, the search results may be communicated to client 1000 as quickly as in the previous embodiment because the list of indexed federated searches must "wait" for a search result to be produced and communicated to front end server 1004 before the list of federated searches are communicated to client 1000.

In another embodiment, as illustrated in FIG. 2, the user interface comprises query field 102, a drop down box 104, search results page 110, and "Search" button 106. Query field 102 may be operable such that a user may enter characters that constitutes a query. Drop down box 104 may be operable to provide a list of a set of one or more indexed federated searches Search button 106 may be in the form of any mechanism that allows a user to select an indexed federated search the user enters, in case the user may not be satisfied with the initial federated search results provided by the respective federated search. The set of federated searches listed in drop down box 104 may be represented in other types of user interface elements, including, but not limited to, a text box, list box, menu, or context menu. The user interface may be viewed using web browser 302, such as, but not limited to, Internet Explorer or Mozilla Firefox.

Figure 11:
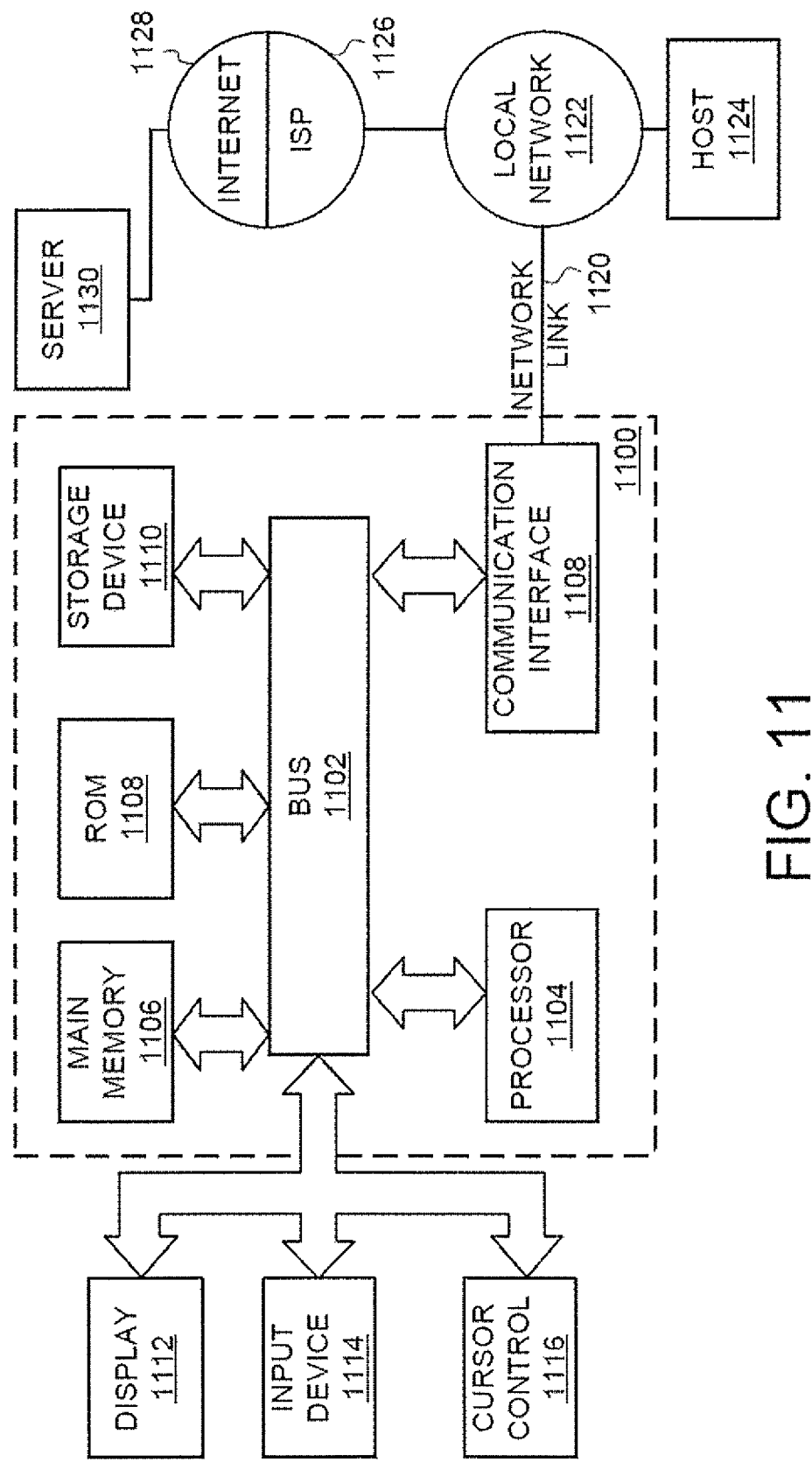
FIG. 11 is a block diagram that illustrates a computer system upon which an embodiment may be implemented.

FIG. 11 is a block diagram that illustrates a computer system 1100 upon which an embodiment may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1 104. A storage device 1110, such as a magnetic disk or optical disk, is provided and coupled to bus 1102 for storing information and instructions.

Computer system 1 100 may be coupled via bus 1102 to display 1112, such as a liquid crystal display (LCD), for displaying information to a computer user. Input device 1114, including alphanumeric and other keys, may be coupled to bus 1102 for communicating information and command selections to processor 1104. Another type of user input device may be cursor control 1116, such as a mouse, a trackball, or cursor direction keys for communicating direction information and command selections to processor 404 and for controlling cursor movement on display 1112. This input device typically has two degrees of freedom in two axes, a first axis (e.g., x) and a second axis (e.g., y), that allows the device to specify positions in a plane.

The subject matter is related to the use of computer system 1100 for implementing the techniques described herein. According to one embodiment, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1100, various machine-readable media are involved, for example, in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 418 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of carrier waves transporting the information.

Computer system 1100 can send messages and receive data, including program code, through the network(s), network link 1120 and communication interface 1 118. In the Internet example, a server 1130 might transmit a requested code for an application program through Internet 1128, ISP 1126, local network 1122 and communication interface 1118.

The received code may be executed by processor 404 as it is received, and/or stored in storage device 1110, or other non-volatile storage for later execution. In this manner, computer system 1100 may obtain application code the form of a carrier wave.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method of executing computer instructions on a server computer that includes at least one processor and at least one physical memory, the method comprising:

acquiring the computer instructions from the at least one physical memory;

executing the acquired computer instructions on the at least one processor;

storing in the at least one physical memory any results of the executing of the acquired computer instructions on the at least one processor;

processing, by the server computer, one or more digital signals received from one or more first remote user computing platforms via a communication network, wherein the one or more digital signals comprise identities of a plurality of federated search sources and one or more user-submitted index keywords to indicate content of the plurality of federated search sources, the plurality of federated search sources comprising at least one search source which is uncrawled and not publically available, the plurality of federated search sources further comprising at least one first federated search source and at least one second federated search source, individual ones of the plurality of federated search sources comprising links to multiple different specified sources of electronic digital signal quantities;

indexing, by the server computer, at least one of the plurality of federated search sources to determine index criteria and to determine at least one federated search source of the at least one first federated search source and the at least one second federated search source related to individual index keywords that comprise at least the one or more user-submitted index keywords, wherein the indexing is based at least in part on matching domains of an indexed federated search to domains of a search engine to return results based at least in part on a category path, wherein the category path of the indexed federated search results is to be matched against a category path associated with a crawler-based search, and wherein the indexing further comprises: retrieving, by the server computer, the one or more digital signals comprising the electronic digital signal quantities from sites associated with a federated search; extracting, by the server computer, weighing factors from the one or more digital signals including at least keywords and the domains; and creating, by the server computer, a table of a plurality of signatures based at least in part on the weighing factors:

storing, by the server computer, the index criteria in a database in the at least one physical memory;

processing, by the server computer, a query received via the network from a second remote user computing platform after performing the indexing;

executing, by the server computer, a web searching protocol to search the at least one of the plurality of federated search sources;

determining, by the server computer, one or more signatures of the plurality of signatures associated with one or more of the plurality of federated search sources based at least in part on the index criteria;

matching, by the server computer, the query with the determined one or more signatures based, at least in part, on the index criteria to determine and rank one or more of the plurality of federated search sources for the query in accordance with a usefulness metric; and at least partially in response to a user selection of one or more of the ranked one or more of the plurality of federated search sources, performing, by the server computer, a federated search, and transmitting electrical signals via the communication network to the second remote user computing platform, the electrical signals comprising results including respective links to the one or more ranked federated search sources for the query and at least one displayable graphical indicator of the usefulness metric for individual ones of the one or more ranked federated search sources.

2. The method of claim 1, wherein the executing the acquired computer instructions further comprises:
determining a signature associated with an indexed federated search source;
comparing the query to the signature; and
determining a closer match between the query and the signature associated with the indexed federated search.

3. The method of claim 2, wherein the executing the acquired computer instructions further comprises:
offering search results based, at least in part, on the indexed federated search source of the closer match between the query and the signature associated with the indexed federated search source.

4. The method of claim 2, wherein the executing the acquired computer instructions further comprises:
offering search results based at least in part on a crawler-based search.

5. The method of claim 2, wherein the indexing is based at least in part on matching domains in a federated search to a domain defined by the query; and wherein comparing is based at least in part on matching domains of a federated search to a domain defined by the query.

6. The method of claim 2, wherein the indexing at least one of the plurality of federated search sources comprises:
offering search results based, at least in part, on the indexed federated search of the closer match between the query and the signature associated with the indexed federated search.

7. The method of claim 1, wherein the usefulness metric is based at least in part on one or more user ratings of the one or more ranked federated search sources.

8. The method of claim 1, wherein at least one of the multiple different specified sources of electronic digital signal quantities comprises a first source of the electronic digital signal quantities that has not been crawled by a search engine performing the query.

9. The method of claim 1, wherein the usefulness metric is based at least in part on one or more user ratings for the one or more ranked federated search sources.

10. The method of claim 1, further comprising performing the query, via the multiple different specified sources of the electronic digital signal quantities, at least in response to receiving a user selection from the second remote user computing platform of the respective links to the one or more ranked federated search sources relating to the query.

11. The method of claim 1, wherein the multiple different specified sources of electronic digital signal quantities comprise one or more websites, web pages, or databases.

12. An article comprising:
a non-transitory storage medium storing computer instructions, wherein the computer instructions are executable by at least one processor of at least one local computing device to:
store in at least one physical memory of the at least one local computing device any results to be generated from the execution of the computer instructions;
process one or more digital signals to be received from one or more first remote user computing platforms via a communication network, the one or more digital signals comprise identities of a plurality of federated search sources and one or more user-submitted index keywords to indicate content of the plurality of federated search sources, the plurality of federated search sources comprising at least one search source which is uncrawled and not publically available, the plurality of federated search sources further comprises at least one first federated search source and at least one second federated search source, individual ones of the plurality of federated search sources comprise links to multiple different specified sources of electronic digital signal quantities;
index at least one of the plurality of federated search sources to determine index criteria and to determine at least one federated search source of the at least one first federated search source and the at least one second federated search source to be related to individual index keywords that comprise at least the one or more user-submitted index keywords, wherein the index is to be based at least in part on a match of domains of an indexed federated search to domains of a search engine to return results to be based at least in part on a category path, wherein the category path of the indexed federated search results is to be matched against a category path to be associated with a crawler-based search, and wherein the index further comprises: retrieve, by a server computer, one or more digital signals comprising the electronic digital signal quantities from sites associated with a federated search; extract, by the server computer, weighing factors from the one or more digital signals including at least keywords and domains; and create, by the server computer, a table of a plurality of signatures based at least in part on the weighing factors;
store the index criteria in a database of the at least one physical memory;
process a query received via the communication network from a second remote user computing platform after performing the indexing;

execute a web searching protocol to search at least one of the plurality of federated search sources;

determine one or more signatures of the plurality of signatures associated with one or more of the plurality of federated search sources to be based, at least in part, on the index criteria;

match the query with the determined one or more signatures to be based, at least in part, on the index criteria to determine and rank one or more of the plurality of federated search sources for the query in accordance with a usefulness metric; and at least partially in response to a user selection of one or more of the ranked one or more of the plurality of federated search sources, perform a federated search, and transmit electrical signals via the communication network to the second remote user computing platform, the electrical signals comprising results including respective links to the one or more ranked federated search sources for the query and at least one displayable graphical indicator of the usefulness metric for individual ones of the one or more ranked federated search sources.

13. The article of claim 12, wherein the instructions are further executable by the one or more processors to:

determine a signature to be associated with an indexed federated search source, compare a query to the indexed federated search source, and determine a closer match between the query and the indexed federated search source, wherein the determine a closer match comprises a determination of the closer match between the query and the signature to be associated with the indexed federated search source.

14. The article of claim 12 wherein the instructions are further executable by the one or more processors to:

determine search results based, at least in part, on the indexed federated search source of a closer match between the query and a signature to be associated with the indexed federated search source.

15. The article of claim 12 wherein the instructions are further executable by the one or more processors to:

index based at least in part on matching domains in a indexed federated search source to a domain to be defined in the query; and wherein comparison of the query is to be based at least in part on matching domains of a federated search source to a domain to be defined in the query.

16. The article of claim 12 wherein the category path of the indexed federated search results is to be matched against a category path to be associated with a non-federated search.

17. An apparatus comprising:

at least one local computing device, the at least one local computing device including at least one processor and computer instructions stored in at least one physical memory;

wherein the computer instructions are executable by the at least one processor to:

store in the at least one physical memory of the at least one local computing device any results to be generated from the execution of the computer instructions;

process one or more digital signals to be received from one or more first remote user computing platforms via a communications network, the one or more digital signals comprise identities of a plurality of federated search sources and one or more user-submitted index keywords to indicate content of the plurality of federated search sources, the plurality of federated search sources comprises at least one search source which is uncrawled and not publically available, the plurality of federated search sources further comprises at least one first federated search source and at least one second federated search source, individual ones of the plurality of federated search sources comprise links to multiple different specified sources of electronic digital signal quantities;

index at least one of the plurality of federated search sources to determine index criteria and to determine at least one federated search source of the at least one first federated search source and the at least one second federated search source to be related to individual index keywords that comprise at least the one or more user-submitted index keywords, wherein the index is to be based at least in part on a match of domains of an indexed federated search to domains of a search engine to return results to be based at least in part on a category path, wherein the category path of the indexed federated search results is to be matched against a category path to be associated with a crawler-based search, wherein the index further comprises: retrieve, by a server computer, one or more signals comprising the electronic digital signal quantities from sites associated with a federated search; extract, by the server computer, weighing factors from the one or more signals including at least key words and domains; and create, by the server computer, table of a plurality of signatures based at least in part on the weighing factors;

store the index criteria in a database of the at least one physical memory;

execute a web searching protocol to search at least one of the plurality of federated search sources;

determine one or more signatures of the plurality of signatures associated with one or more of the plurality of federated search sources to be based, at least in part, on the index criteria;

process a query to be received via the communication network from a second client computing platform after performance of the index;

match the query with the determined one or more signatures to be based, at least in part, on the index criteria to determine and rank one or more of the plurality of federated search sources for the query in accordance with a usefulness metric; and at least partially in response to a user selection of the ranked one or more of the plurality of federated search sources, perform a federated search, and transmit electrical signals via the communication network to the second client computing platform, the electrical signals comprise results including respective links to the one or more ranked federated search sources for the query and at least one displayable graphical indicator of the usefulness metric for individual ones of the one or more ranked federated search sources.

18. The apparatus of claim 17, wherein the computer instructions are further executable by the at least one local computing device to:

determine a signature to be associated with a particular indexed federated search source;

compare the query to the signature; and determine a closer match between the query and the signature to be associated with the particular indexed federated search source.

19. The apparatus of claim 17, wherein the computer instructions are further executable by the at least one local computing device to: present the results to be based at least in part on a crawler-based search.

\* \* \* \* \*